Aug. 19, 1941.    K. RABE    2,252,862
SPRING SUSPENSION FOR VEHICLES
Filed July 20, 1938

Inventor
Karl Rabe
By
Attorneys

Patented Aug. 19, 1941

2,252,862

UNITED STATES PATENT OFFICE 2,252,862

SPRING SUSPENSION FOR VEHICLES

Karl Rabe, Stuttgart, Germany, assignor to Dr. Ing. h. c. F. Porsche, K.-G., Stuttgart-Zuffenhausen, Germany, a company of Germany Application July 20, 1938, Serial No. 220,167
In Germany July 28, 1937

14 Claims. (Cl. 180—22)

This invention relates to a spring suspension for vehicles and is particularly concerned with the suspension of twin wheels.

An object of my invention is the provision of an improved simple suspension for vehicles.

Another object of my invention is the provision of an improved arrangement for the suspension of twin wheels for a vehicle.

Still another object of my invention is the provision of an independent twin wheel suspension whereby the wheels are independent of one another and swing relatively to the frame independently of the other twin wheels.

A further object of my invention is the provision of an arrangement whereby a single springing device is utilized for twin wheels which at the same time may move independently of one another.

A comprehensive object of my invention is the provision of a construction permitting the use of swinging half axles for driven twin wheels of a vehicle, the wheels being independent of one another and sprung through the use of a single common springing device.

Figure 1:
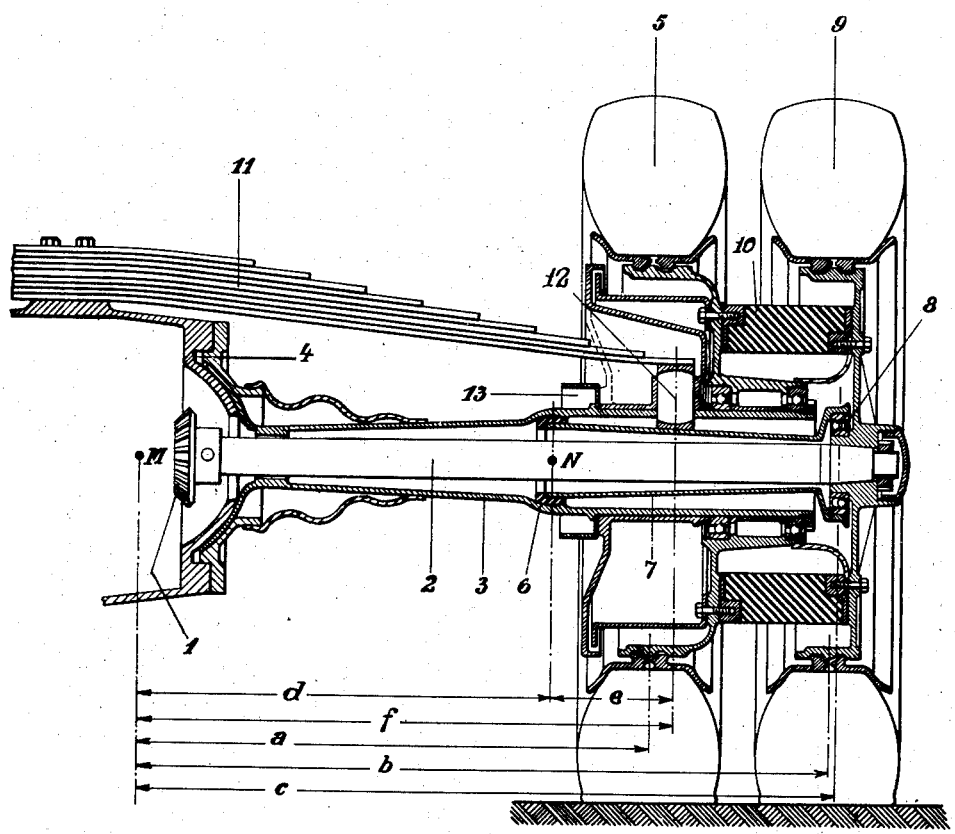
Figure 2:
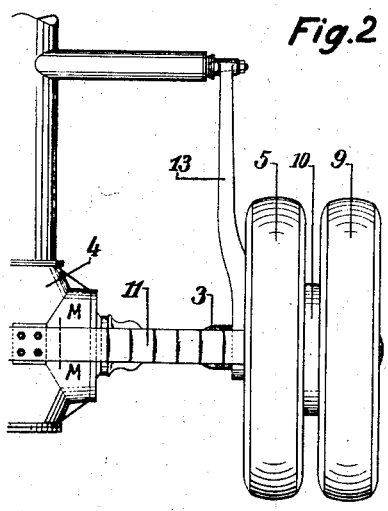

Other objects of this invention will become apparent from a study of the following specification taken in connection with the accompanying drawing wherein:

Fig. 1 is a vertical transverse cross-sectional view of the spring suspension of this invention as applied to the twin wheels of one side of a vehicle; and Fig. 2 is a plan view of the same showing the interconnection of the twin wheels with the vehicle frame.

A preferred form of my invention as shown in the drawing is its use with the driving wheels of a vehicle wherein the gear 1 forms part of the usual differential mechanism and has attached thereto for rotation therewith a driving shaft 2. Surrounding the driving shaft 2 is an arm in the form of a tubular member 3 which may be pivotally mounted for swinging movement relative to the frame, by means of an extension slidably arranged in the driving housing 4. At the outer end of the tubular member 3 one of the twin wheels 5 is journalled, shown here as the inner twin wheel. Connected within the tubular member 3 at a point intermediate the ends thereof by means of a resilient attachment such as rubber cushions 6, is a second tubular member or connecting link 7, the outer end of which is in turn pivotally interconnected with the drive shaft 2 through suitable means such as a pivotal bearing 8. The wheel 9 is directly attached to the drive shaft 2 and is interconnected with the wheel 5 through suitable resilient means such as the rubber cushions 10. A spring device such as the leaf spring 11 is connected by any suitable means to the vehicle frame at one end and at its outer end presses through an abutting pin 12 upon the inner tubular member 7. A strut 13 is attached to the outer tubular member 3 at one end and suitably to the frame at its other end for defining the motion of the wheels relative to the frame.

A study of the construction described above will show that both of the twin wheels can partake of an up and down movement relative to the frame and substantially independently of one another. The inner wheel 5 being mounted upon the tubular member 3 will swing about the axis M, preferably a horizontal axis positioned substantially in the central longitudinal plane of the vehicle. Similarly but independently the wheel 9 being mounted upon the shaft 2 will also swing about the same axis M due to the motion of the gear wheel 1 about its cooperating differential gears. Due to the resilient rubber cushions between the wheels 5 and 9, these wheels can also partake of an up and down movement relative to each other. The rubber cushions 10 on the other hand act to drive the wheel 5 from the wheel 9 which in turn is driven through the drive shaft 2.

The inner tubular member 7 being resiliently attached to the tubular member 3 will upon up and down motion of the wheels oscillate about this point of attachment, the center of oscillation being approximately the point designated as N. The spring acting upon the tubular member 7 which is in turn connected with both of the twin wheels will exert a force upon both of these wheels and if the elements are properly proportioned the effect can be made equal upon both wheels.

Under normal conditions of travel the load upon both of the wheels 9 and 10 will be equal, the opposing reaction of the spring upon these wheels will be equal, and the parts will assume the position illustrated in the drawing. Under these circumstances the effect of the spring upon the wheels can be shown to be determined by the point of connection between the inner tubular member 7 and the outer tubular member 3 relative to the center of movement of the wheels. This distance M—N, equals the distance $d$ illustrated on the drawing. This distance $d$ and, therefore, the strength of the springing can be determined by the relative positions of the other parts in accordance with the formula:

$$d = \frac{af}{a+b-\frac{bf}{c}}$$

reference being made to the drawing to indicate the distances corresponding to the above letters.

This formula may be derived in several ways, one of which is as follows, noting that the small letters all indicate distances as designated upon Fig. 1 of the accompanying drawing:

Assuming that:
 $x$ = force on wheel 5
 $x'$ = force on wheel 9
 $P$ = reaction force of spring 11
 $P'$ = reaction force of connection 6
 $P''$ = reaction force of connection 8

Then:
$$ax = P'd \text{ and } x = P'\frac{d}{a} \quad (1)$$

and
$$P'(c-d) = P(c-f) \text{ and } P' = P\frac{c-f}{c-d} \quad (2)$$

combining (1) and (2)
$$\therefore x = \frac{d}{a} P \frac{c-f}{c-d} \quad (3)$$

And
$$bx' = cP'' \text{ and } x' = \frac{c}{b} P'' \quad (4)$$

and
$$P''(c-d) = P(f-d) \text{ and } P'' = P\frac{f-d}{c-d} \quad (5)$$

Combining (4) and (5)
$$\therefore x' = \frac{c}{b} P \frac{f-d}{c-d} \quad (6)$$

For equalization of force on wheel 5 and 9
$$x = x' \quad (7)$$

Then:
$$\frac{d}{a}P\frac{c-f}{c-d} = \frac{c}{b} P\frac{f-d}{c-d} \text{ cancelling } \frac{d}{a}(c-f) = \frac{c}{b}(f-d)$$

multiplying
$$bcd - bdf = acf - acd \text{ transposing } acd + bcd - bdf = acf$$

or
$$d(ac+bc-bf) = acf$$

and
$$d = \frac{acf}{c(a+b) - bf}$$

$$\therefore d = \frac{af}{a+b-\frac{bf}{c}}$$

Q. E. D.

The advantages of the above described construction are numerous, the principal advantage however, being in that for the first time an arrangement has been provided wherein driving twin wheels are mounted not only for swinging movement relative to the frame, thus taking advantage of all the desirable characteristics of an independent spring suspension, but are also movable relative to one another, while at the same time being effectively equally sprung relative to the frame through the use of a single spring device.

Many changes can be made in my construction which will be obvious to those skilled in the art without departing from the principles of this invention. It will be clear that the arrangement which I have provided will operate as undriven twin wheels as well as driven twin wheels; in other words, the shaft 2 need not be a drive shaft. The exact type of spring suspension is unimportant and while a leaf spring has been illustrated it obviously may be replaced by a torsion spring, coil spring, etc., suitably acting upon the intermediate axle tube.

Additionally, the particular means illustrated for providing pivotal movement of the drive shaft 2 and of the tubular member 3 need not be followed, but any suitable arrangement known to the art may be used provided, however, that both of these parts pivot about a common axis.

Furthermore, while rubber cushions have been illustrated as connecting the tubular member 7 with the tubular member 3 it will be obvious that any suitable connection can be used which permits pivotal movement between these two members. Similarly resilient means of any type may be substituted for the rubber cushions 10 so long as they permit relative up and down motion between the wheels and also can act to transmit the driving torque from the wheel 9 to the wheel 5 in the case where one of the wheels is driven.

Accordingly, I do not intend that my invention be limited to the exact structure shown and described, but only as required by the claims which follow:

1. In a vehicle having a frame, in combination, co-axial twin wheels for supporting said vehicle, separate means for mounting each of said wheels for pivotal movement relative to the frame, means for resiliently interconnecting said wheels, an intermediate member pivotally interconnecting said separate means, and a spring device for supporting said intermediate member relatively to the vehicle frame.

2. In a vehicle having a frame, in combination, twin wheels for supporting said vehicle, a drive shaft connected to one of said wheels, a co-axial tube surrounding said drive shaft and pivotally connected at one end to said frame for movement about a horizontal axis, bearing means on the other end of said tube for rotatably supporting the other twin wheel, a rubber member interconnecting said twin wheels, a second co-axial tube surrounding said drive shaft intermediate said first tube, rubber cushions for connecting one end of said second tube to said first tube, a pivotal bearing interconnecting the other end of said second tube with said drive shaft, a leaf spring attached at one end to said frame and having an abutment on its other end extending through said first tube and resiliently pressing against said second tube, whereby said wheels are sprung relative to said frame, and a swinging strut interconnecting said first tube with said frame for guiding said twin wheels for up and down movement relative to the frame.

3. The combination according to claim 2, in which said drive shaft is mounted for pivotal movement about the same axis as said first tube.

4. In a vehicle having a frame, in combination, twin wheels for supporting said vehicle, a drive shaft connected to one of said wheels, a co-axial tube surrounding said drive shaft and pivotally connected at one end to said frame for movement about a horizontal axis, bearing means on the other end of said tube for rotatably supporting the other twin wheel, first spring means interconnecting said twin wheels, a second co-axial tube surrounding said drive shaft intermediate said shaft tube, second spring means for connecting one end of said second tube to said first tube, a pivotal bearing interconnecting the other end of said second tube by said drive shaft, third spring means attached at one end to said frame and having an abutment on its other end extending through said first tube and resiliently pressing against said second tube whereby said wheels are sprung relative to said frame, and a swinging strut interconnecting said first tube with said frame for guiding said twin wheels for up and down movement relative to the frame.

5. The combination according to claim 4, wherein said first and second spring means comprise rubber cushions.

6. The combination according to claim 4, wherein said third spring means is a leaf spring.

7. In a vehicle having a frame, in combination, twin wheels for supporting said vehicle, a drive shaft connected to one of said wheels, a co-axial tube surrounding said drive shaft and pivotally connected at one end to said frame for movement about a horizontal axis, means on the other end of said tube for rotatably supporting the other twin wheel, first spring means interconnecting said twin wheels, a second tube co-axial with said drive shaft and said first tube, second spring means for connecting one end of said second tube to said first tube, means interconnecting the other end of said second tube with said drive shaft, third spring means attached at one end to said frame and having an abutment on its other end resiliently pressing against said second tube, whereby said wheels are sprung relative to said frame, and a swinging strut interconnecting said first tube with said frame for guiding said wheels for up and down movement relative to the frame.

8. In a vehicle having a frame, in combination, twin wheels for supporting said vehicle, a pair of arms, one connected to each twin wheel and pivotally connected to said frame to swing about a common axis, a link pivotally interconnecting said arms, and spring means intermediate said frame and link.

9. The combination according to claim 8, in combination with means for resiliently connecting said wheels with one another.

10. The combination according to claim 8, in combination with resilient means for connecting said link with one of said arms.

11. The combination according to claim 8, in which one of said arms comprises a tubular member surrounding the other arm.

12. The combination according to claim 8, in which said link comprises a tubular member surrounding one of said arms.

13. The combination according to claim 8, in which one of said arms comprises a drive shaft, and means for interconnecting said wheels for driving both by said shaft.

14. The combination according to claim 8, in which one of said arms comprises a drive shaft, and resilient means for interconnecting said wheels for driving both by said shaft.

KARL RABE.